United States Patent [19]

Shigematsu et al.

[11] Patent Number: 5,034,255
[45] Date of Patent: Jul. 23, 1991

[54] OPTICAL RECORDING MEDIUM AND METHOD OF ITS PRODUCTION

[75] Inventors: Shigeto Shigematsu; Koji Tsuzukiyama, both of Ichihara, Japan

[73] Assignee: Mitsui Petrochemical Industries, Ltd., Tokyo, Japan

[21] Appl. No.: 424,616

[22] Filed: Oct. 20, 1989

[30] Foreign Application Priority Data

Oct. 28, 1988 [JP] Japan .................. 63-272695
Oct. 28, 1988 [JP] Japan .................. 63-272696

[51] Int. Cl.$^5$ ............................. G32R 3/02
[52] U.S. Cl. .............................. 428/64; 428/65; 428/412; 428/913; 369/288; 346/761; 346/135.1; 436/945
[58] Field of Search ............ 428/64, 65, 412, 913; 369/288; 346/76 L, 135.1; 430/945

[56] References Cited

U.S. PATENT DOCUMENTS 4,587,209  5/1986  Ohno et al. .............. 346/135.1
4,839,208  6/1989  Nakagawa et al. .......... 428/64
4,978,768 10/1984  Takeoka et al. ........... 430/270

FOREIGN PATENT DOCUMENTS 0366455  5/1990  European Pat. Off.

OTHER PUBLICATIONS

Jap. Pat. Abs., 01100745, Info. Rec. Mod., JP87256242, 10-13-87, Toshiba KK.

Primary Examiner—Patrick J. Ryan
Attorney, Agent, or Firm—Sherman and Shalloway

[57] ABSTRACT

Disclosed in this invention are optical recording media comprising a substrate, a recording layer formed on the substrate and a protective layer formed on the recording layer, in which the recording layer is irradiated with a beam of energy, thereby causing the change of optical properties at the irradiated portions on the recording layer so as to record information,
wherein said recording layer is a thin film containing Te and N, and further Pd, if necessary, and producing methods thereof.

7 Claims, 3 Drawing Sheets

OPTICAL RECORDING MEDIUM AND METHOD OF ITS PRODUCTION

FIELD OF THE INVENTION

This invention relates to optical recording media and methods for producing thereof, and more particularly to optical recording media designed to be projected by a beam of energy such as light or heat on a recording layer installed on a substrate, thereby changing the optical properties at this irradiated portion so as to record information, and their production method.

BACKGROUND OF THE INVENTION

The optical recording media can be classified into two types; one is designed to form physically deformed portions (pits) including holes and concavities on parts of a recording layer, and the other is designed to generate phase changings on parts of the recording layer and form portions where optical properties (refractive index, reflectance, transmission and others) are changed. The optical recording media in the type of forming physically deformed portions such as holes on parts of the recording layer (pit-forming type) are mainly used at present.

The pit-forming type optical recording media, however, have such problems as ① a relatively large optical power for recording is required when forming pits on parts of the recording layer, ② the shape of recording pits is hard to ③ recording at high density is difficult, and ④ two optical recording media cannot be adhered closely and laminated to each other. To the contrary, the optical recording media designed to change optical properties due to phase change on parts of the recording layer (phase-changing type) can solve the above problems associated with the pit-forming type optical recording media.

As phase-changing type optical recording media, for example, optical recording media having alloyed recording layers composed of Te, Ge and Sb (Japanese Patent L-O-P Publns. No. 62-19618) and having a recording layer composed of Te, Sn, Zn and S (Japanese Patent L-O-P Publns. No. 62-167632) are well known. In such optical recording media having recording layers composed of alloy, however, it is relatively difficult to control the composition of alloy when forming the recording layer on the substrate, which causes low reproducibility, and it is impossible to produce the optical recording media having a desired constant performance at high productivity.

A phase-changing type optical recording media, having a recording layer containing Te Ox (Japanese Patent L-O-P Publns. No. 50-46317) is also known. This optical recording media include such problems that ① stability in amorphous state is low, that is, its service life is short because the crystallization temperature of the recording layer is low, and ② the safety in the process of forming the layer cannot be guaranteed when the reactive sputtering is executed in the atmosphere of oxygen because oxygen accerates burning.

The present inventors made an extensive effort on the optical recording media having a recording layer of the phase-changing type containing Te as its main ingredient to find the fact that a optical recording media having a recording layer containing N and, if necessary, Pd in addition to Te between a substrate and a protective layer has improved amorphous stability (a property keeping the amorphous state stable) of the recording layer and enhanced oxidation resistance, and that the life of the optical recording media can be prolonged. The present inventors have also found that by setting the thickness of the recording layer in a specific range, readout error of the information can be reduced.

OBJECT OF THE INVENTION

This invention is accomplished on the basis of such novel knowledge, and it is hence an object of this invention to present optical recording media in the phase-changing method, capable of increasing the amorphous stability of the recording layer and enhancing the oxidation resistance, extending the duration of life of the optical recording media, and reducing the errors when reading the information.

SUMMARY OF THE INVENTION

To achieve the above object, a first optical recording medium of the present invention comprises a substrate, a recording layer formed on the substrate and a protective layer formed on the recording layer, in which the recording layer is irradiated with a beam of energy, thereby causing phase changes at the irradiated portions on the recording layer and forming portions wherein optical properties are changed, so as to record information, wherein the recording layer is a thin film containing Te and N.

A second optical recording medium according to the present invention comprises a substrate, a recording layer formed on the substrate and a protective layer formed on the recording layer, in which the recording layer is irradiated with a beam of energy, thereby causing phase change at the irradiated portions on the recording layer and forming portions wherein optical properties are changed, so as to record information, wherein the recording layer is a thin film containing Te, Pd and N.

A first method of this invention is to produce an optical recording media which comprise a substrate, a recording layer containing Te and N formed on the substrate, and a protective layer formed on the recording layer, in which the recording layer is irradiated with a beam of energy, thereby causing phase change at the irradiated portions on the recording layer and forming portions wherein optical properties are changed, so as to record information, wherein a reactive sputtering is executed in the atmosphere of Ar and $N_2$ gas when forming the recording layer on the substrate, and the flow rate $\{(N_2/(Ar+N_2)\}$ of $N_2$ to the total flow of Ar and $N_2$ is set in a range of from 5 to 50%.

A second method of this invention is to produce an optical recording media which comprise a substrate, a recording layer containing Te, Pd and N formed on the substrate, and a protective layer formed on the recording layer, in which the recording layer is irradiated with a beam of energy, thereby causing phase change at the irradiated portions on the recording layer and forming portions in which optical properties are changed, so as to record information, wherein a reactive sputtering is executed by using a target comprising Te and Pd, in the atmosphere of Ar and $N_2$ gas when forming the recording layer on the substrate, and the flow rate $\{(N_2/(Ar+N_2)\}$ of $N_2$ to the total flow of Ar and $N_2$ is in a range of from 1 to 80%.

According to the above optical recording media and their production methods of this invention, the amorphous stability and the oxidation resistance of the recording layer can be improved and the duration life of the optical recording media can be prolonged by incorporating N and, if necessary, Pd into the recording layer mainly composed of Te, and by installing the recording layer between the substrate and the protective layer. Moreover, by setting the thickness of the recording layer to a specific value, the readout errors of the information can be reduced.

10 . . . Optical recording medium, 11 . . . substrate, 12 . . . recording layer, 13 . . . protective layer.

DETAILED DESCRIPTION OF THE INVENTION

The optical recording media and the methods for producing thereof according to the present invention are described in detail below.

Figure 1:
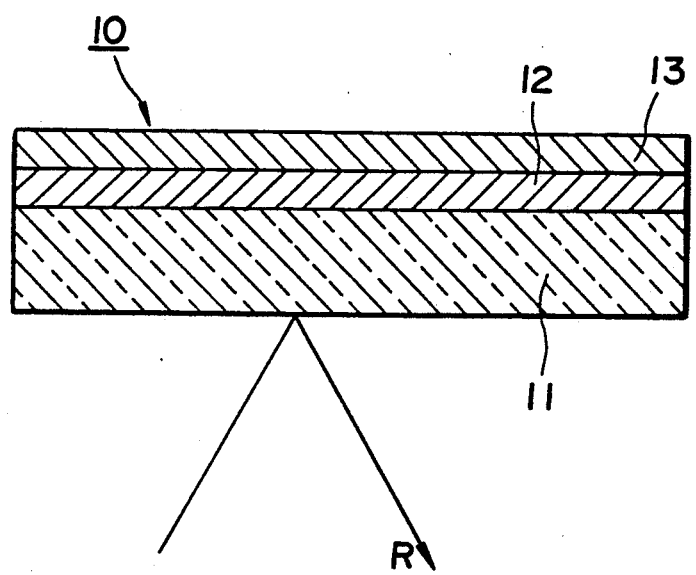
FIG. 1 is a schematic sectional drawing of the optical recording medium of an example of this invention.

As shown in FIG. 1, an optical recording medium 10 according to this invention is composed of a substrate 11, a recording layer 12 formed on the surface of the substrate, and a protective layer 13 formed on the surface of the recording layer 12.

As the substrate 11, in addition to inorganic materials such as glass and aluminum, organic materials including polymethylmethacrylate, polycarbonate, polymer alloy of polycarbonate and polystyrene, amorphous polyolefin which is disclosed in the specification of U.S. Pat. No. 4,614,778, poly-4-methyl-1-pentene, epoxy resin, polyethersulfone, polysulfone, polyetherimide, copolymer of ethylene and tetracyclododecene can be used. The thickness of this substrate 11 may be such as sufficient to impart an appropriate stiffness to the entire recording medium 10, and it is preferably from 0.5 to 2.5 mm and more preferably to 1 to 1.5 mm.

In the first optical recording medium of this invention, the recording layer 12 is a thin film containing Te as its main ingredient and N as its subingredient, and it may contain low-melting elements other than Te or other elements.

The content of N in the first recording layer based on the total number of atoms in the recording layer is preferably in a range of from 0.1 to 60 atom %, more preferably in a range of from 0.3 to 50 atom %, and most preferably in a range of from 0.5 to 30 atom %. These values are measured by ESCA(X-ray photoelectron spectrum) Model SSX-100 made by Surface Science Instruments. The measurement condition is as follows:

Background pressure: $5\times 10^{-10}$ Torr
Spot size of X-ray: 0.6 mm$\phi$
Addition integration: 6 times
Excitation Source: Al K$\alpha$-ray(1487e V).

By incorporating N in such ranges, the amorphous stability and oxidation resistance of the recording layer can be enhanced.

The low-melting elements other than Te or other elements include Ti, Mn, Ni, Zr, Nb, Ta, Al, Pt, Sm, Si, In, Se, Pb, Co, Sn, Zn, Ge, Sb and the like. The content of these elements based on the total of atoms in the recording layer may be from 0 to 60 atom %, more preferably from 0 to 40 atom %.

In the second optical recording medium of this invention, the recording layer 12 is a thin film containing Te as its main ingredient, Pd and N, and it may contain low-melting elements other than Te and Pd or other elements. The elements other than Te which may be contained in the recording layer 12 include Ti, Mn, Ni, Zr, Nb, Ta, Al, Pt, Sm, Bi, In, Se, Pb, Co, Si, Pd, Sn, Zn, Ge, Sb and the like.

The content of Pd in the second recording layer 12 based on the total atoms in the recording layer is in a range of from 1 to 80 atom %, preferably in a range of from 2 to 60 atom %, and more preferably in a range of from 3 to 40 atom %. By incorporating Pd in such ranges, the recording sensitivity and C/N ratio of the recording layer can be enhanced, and in addition, the recording power margin can be widened, and the film-forming property can be improved.

The content of N in the second recording layer 12 based on the total number of atoms in the recording layer is preferably in a range of from 0.1 to 60 atom %, more preferably in a range of from 0.3 to 50 atom %, and especially preferably in a range of from 0.5 to 30 atom %. By incorporating N in such ranges, the amorphous stability and oxidation resistance of the recording layer 12 can be enhanced.

The contents of the metallic elements (Te, Pd and others) contained in the recording layer 12 are measured by ICP emission analysis (inductive coupling type plasma emission analysis) and the contents of N contained in the recording layer 12 is measured by ESCA (X-ray photoelectron spectrum).

The thickness of the recording layer 12 is from 100 Å to 1 $\mu$m, preferably from 300 to 1500 Å, and more preferably from 700 to 1300 Å.

The first recording layer 12 in the first optical recording medium of this invention can be formed on the surface of the substrate 11 in the following manner.

At first, a reactive sputtering is executed by using a Te target in the mixed gas of $N_2$ gas and Ar gas, thereby forming the first recording layer 12 composed of a Te thin layer containing N on the substrate 11. In such a reactive sputtering, by controlling the flow ratio $\{N_2/(Ar+N_2)\}$ of $N_2$ gas and Ar gas, the content of N in the first recording layer 12 can be controlled. The flow ratio $\{N_2/(Ar+N_2)\}$ of the $N_2$ gas and Ar gas is in a range of from 5 to 50%, more preferably from 10 to 30%. Forming the first recording layer 12 by sputtering in such an atomosphere can afford the recording layer 12 with a high amorphous stability and an excellent oxidation resistance. It is also possible to form the recording layer 12 on the substrate by a codeposition method wherein Te vapor and Te nitride vapor in the plasma state are deposited together, instead of by a sputtering method. Similar recording layers 12 can be also formed by a vapor phase growth method or plasma vapor phase growth method. It is also possible to ionize a part of or all of the Te and N atoms and compile them on the substrate in the beam shape.

The recording layer 12 in the second optical recording medium of this invention, for example, can be formed on the surface of the substrate 11 in the following manner.

At first, a reactive sputtering is executed by using an alloy target of Te and Pd or a Te target having arranged Pd chips in the mixed gas of $N_2$ gas and Ar gas, thereby forming the second recording layer 12 composed of a Te thin layer containing Pd and N on the substrate 11. In such a reactive sputtering, by controlling the flow ratio $\{N_2/(Ar+N_2)\}$ of $N_2$ gas and Ar gas, the content of N in the recording layer 12 can be controlled. The flow ratio $\{N_2/(Ar+N_2)\}$ of the $N_2$ gas and Ar gas is in a range of from 1 to 80%, more preferably from 10 to 40%. Forming the second recording layer 12 by sputtering in such an atmosphere can afford the second recording layer 12 with a high amorphous stability and an excellent oxidation resistance on the substrate. It is also possible to form the second recording layer 12 on the substrate by a codeposition method wherein Te vapor, Pd vapor and Te nitride vapor in the plasma state are deposited together, instead of by a sputtering method. Similar recording layers 12 can be formed also a vapor phase growth method or plasma vapor phase growth method. It is also possible to ionize a part of or all the Te, N and Pd atoms and compile them on the substrate in the beam shape.

The protective layer 13 is formed on the thus formed recording layer 12. It is desirable to form the protective layer 13 with materials having a low thermal conductivity (preferably 1.0 W/cm deg or lower) in order to prevent heat from escaping when recording information to the recording layer 12 and to improve the recording sensitivity. For example, the protective layer 13 is composed of organic materials such as ultraviolet cured resin, inorganic materials such as Ti, Al, Ni and Cr, or materials formed by combining them. The thickness of the protective layer is from 50 Å to 1 mm, and preferably from 100 Å to 0.1 mm.

Such a protective layer 13 can be formed on the surface of the recording layer 12 in the same manner as described for forming the recording layer 12, by the reactive sputtering method, vapor phase growth method, plasma vapor phase growth method, vapor deposition method, or spin coat method or others.

In order to write data to the above recording layer 12, a beam of energy such as laser beam which is modulated (on/off) according to the data to be recorded is irradiated, for example, from the substrate 11 side to the recording layer 12, thereby changing the phase of the recording layer 12 at the irradiated portion from amorphous to crystaline, and forming the portions where the optical properties are changed corresponding to the irradiated portions. There is a difference in the reflectance R at the irradiation of a read-out laser beam between the portions where the optical properties are changed and where not changed, and by using this difference in the reflectance R, the data can be read out.

EFFECTS OF THE INVENTION

According to the optical recording media and the production method therefor, since N is contained in the recording layer mainly comprising Te, and the recording layer is provided between the substrate and the protective layer, the amorphous stability and oxidation resistance of the recording layer are enhanced and the duration life of the optical recording media can be extended. When the recording layer further contains Pd, the recording layer cannot be fragile even if the content of N is increased, and the film-forming property is thus enhanced. In addition, according to the present invention, not only the C/N ratio is enhanced when reading out the data, but also the recording power margin is widened.

EXAMPLE

The present invention is described in details with reference to the examples, but this invention, of course, cannot be limited to these examples.

EXAMPLE 1

Figure 2:
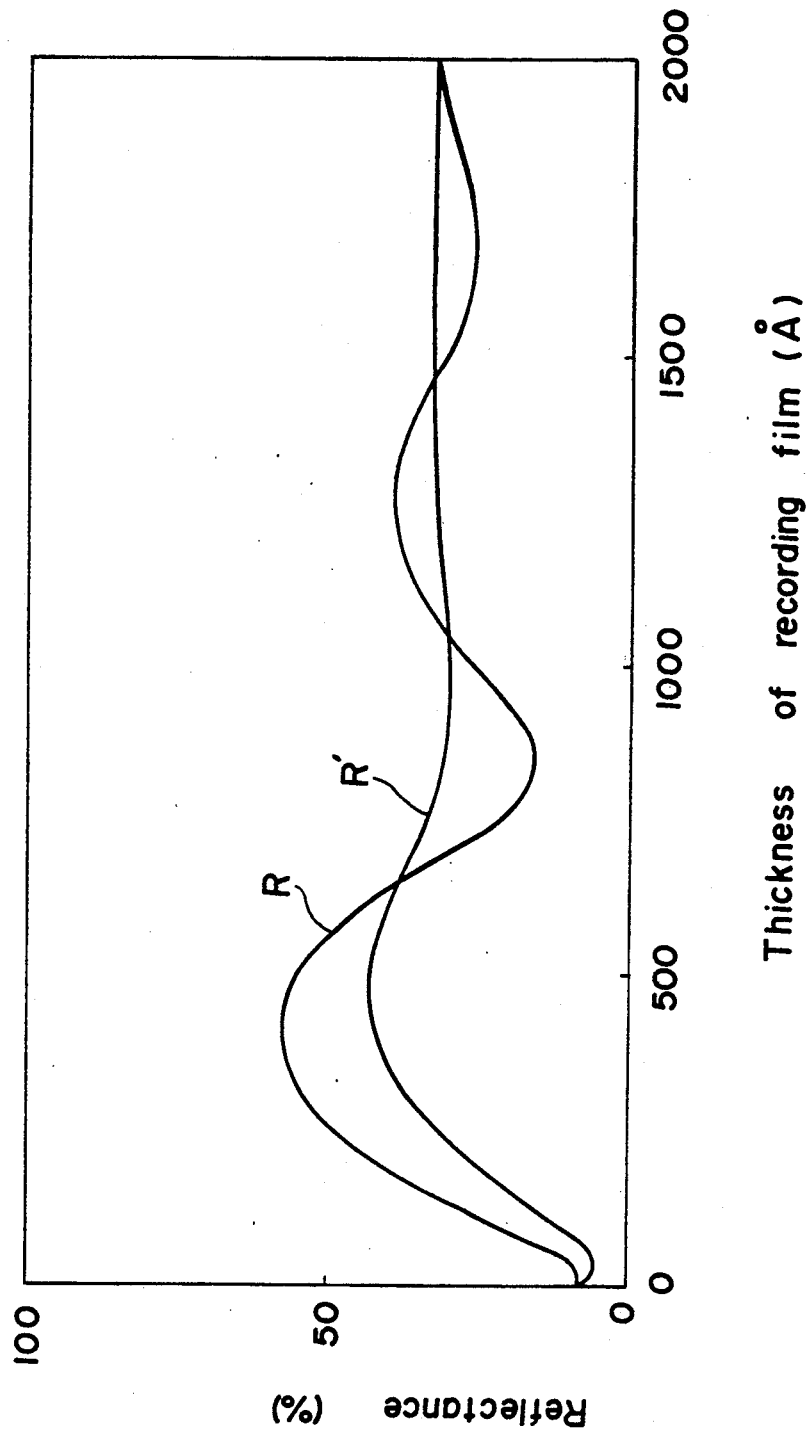
FIG. 2 and FIG. 3 are the graphs showing the relation between the thickness of the recording layer and the reflectance in the optical recording medium according to the example of this invention.

In an optical recording medium 10 having the structure shown in FIG. 1, a relationship is shown in FIG. 2 between a change of reflectance of read-out light from the substrate side and a thickness of the recording layer measured on an optical recording medium comprising an amorphous polyolefin resin board as a substrate 11 and a $Te_{85}N_{15}$ layer (sputtering condition: $\{N_2/(Ar+N_2)\}=20$(flow rate %)) as a recording layer 12. The content of N in the recording layer is 15 atom % measured by ESCA. The value was calculated by using the read-out light having a wavelength λ of 830 nm and assuming that the optical recording medium was installed in the air.

In FIG. 1, R shows a relationship between the reflectance of the optical recording medium and the thickness of the recording layer before the irradiation of the recording light, and R' shows the same relationship after irradiation.

It was confirmed that, when the thickness of the recording layer was in a range of from 750 to 950 Å, the difference in reflectance $\Delta R(=R-R')$ became large, which caused the decrease of readout errors of the data under such conditions.

EXAMPLE 2

Figure 3:
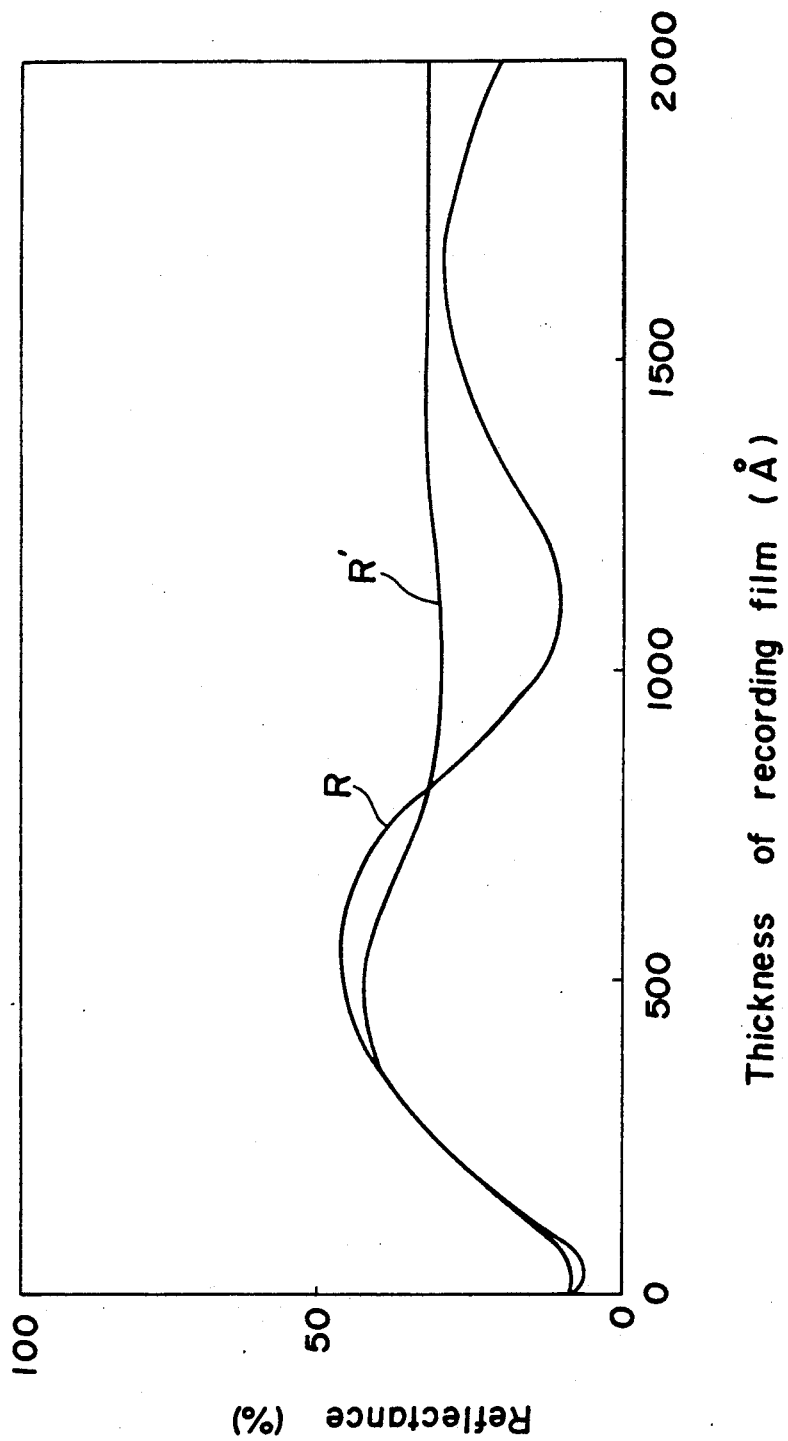

The change of reflectance was obtained in the same conditions as those in Example 1 except that the sputtering condition was changed to $\{N_2/(Ar+N_2)\}=40$ (flow rate %), and is shown in FIG. 3. In this case, it was found out that the readout error of the information can be reduced if the thickness of the recording layer was in a range of from 950 to 1300 Å.

EXAMPLE 3

An optical recording medium was produced by using a disk substrate made of amorphous polyolefin resin, forming thereon a Te85N15 layer having a thickness of 900 Å as a recording layer 12 by the reactive sputtering under the condition of $\{N_2/(Ar+N_2)\}=20$ (flow rate %), and further forming an ultraviolet cured resin by a spin coat method. The C/N ratio of this optical recording medium was measured under the following conditions; disk rotation rate was 1800 rpm, evaluation position was at 50 mm of radius, recording frequency 1 MHz·duty=50%, and it was obtained that the C/N ratio fo 40 dB or higher could be obtained.

COMPARATIVE EXAMPLE 1

An optical recording medium was produced under the same conditions as those in Example 3 only by changing the sputtering condition to Ar=100 flow rate %.

The C/N ratio of this optical recording medium was measured in the same manner as in Example 3 to obtain the C/N ratio of only 13 dB at maximum. It is considered to be because, when the recording layer was made of only Te, the recording layer was already crystallized at some parts right after forming the recording layer, and the difference of optical properties between the irradiated portions with laser beam and the non-irradiated portions was small.

EXAMPLE 4

Using a disk substrate made of amorphous polyolefin resin as a substrate 11, a $Te_{85}N_8Pd_7$ layer was formed on this substrate as a recording layer 12 by reactive sputtering ($\{N_2/(Ar+N_2)\}=20$ (flow rate %)) by the Te target on which Pd tips were mounted. The content of N in a recording layer is 8 atom % measured by ESCA and the content of Pd is 7 atom % measured by ICP. ICP means an inductively coupled plasma spectrometry. A protective layer 13 was further formed from an ultraviolet cured resin by the spin coat method, thereby producing an optical recording medium.

The C/N ratio of this optical recording medium was measured under the following conditions; disk rotation rate was 900 rpm, evaluation position was at 50 mm of radius, recording frequency 1 MHz, duty=50%, and it was found that a C/N ratio of 50 dB or higher could be obtained.

EXAMPLE 5

The sputtering was executed under the same conditions as in Example 4 only by changing $\{N_2/(Ar+N_2)\}$ to 50 (flow rate %), and it was checked that the layer could be formed.

What is claimed is:

1. An optical recording medium comprising a substrate, a recording layer formed on the substrate and a protective layer formed on the recording layer, in which the recording layer is irradiated with a beam of energy, thereby causing the change of optical properties at the irradiated portions on the recording layer so as to record information, wherein said recording layer is a thin film containing Te and N, the thickness of the recording layer is from 100 Å to 1 μm and the content of N in the recording layer is from 0.1 to 60 atom % based on the total atoms contained in the recording layer.

2. The optical recording medium comprising a substrate, a recording layer formed on the substrate and a protective layer formed on the recording layer, in which the recording layer is irradiated with a beam of energy, thereby causing the change of optical properties at the irradiated portions on the recording layer so as to record information, wherein said recording layer is a thin film containing Te, Pd and N, the thickness of the recording layer is from 100 Å to 1 μm, and the content of Pd in the recording layer is from 1 to 80 atom % based on the total atoms contained in the recording layer.

3. The optical recording medium as set forth in claim 1, wherein the content of N in the recording layer is from 0.1 to 60 atom % based on the total atoms contained in the recording layer.

4. A method of producing optical recording media which comprise a substrate, a recording layer containing Te and N formed on the substrate, and the protective layer formed on the recording layer, in which the recording layer is irradiated with a beam of energy, thereby causing the change of optical properties at the irradiated portions on the recording layer so as to record information, wherein said recording layer is formed on the substrate by a reactive sputtering in an atmosphere of Ar and $N_2$ gas using a Te target, and the flow rate $\{N_2/(Ar+N_2)\}$ of said $N_2$ to the total flow of Ar and $N_2$ is in a range of from 5 to 50%.

5. The method as set forth in claim 4, wherein said rate $\{N_2/(Ar+N_2)\}$ is in a range of from 10 to 30%.

6. A method of producing optical recording media which comprise a substrate, a recording layer containing Te, Pd and N formed on the substrate, and a protective layer formed on the recording layer, in which the recording layer is irradiated with a beam of energy, thereby causing the change of optical properties at the irradiated portions on the recording layer so as to record information, wherein said recording layer is formed on the substrate by a reactive sputtering in an atmosphere of Ar and $N_2$ gas using a target comprising Te and Pd, and the flow rate $\{N_2/(Ar+N_2)\}$ of said $N_2$ to the total flow of Ar and $N_2$ is in a range of from 1 to 80%.

7. The method as set forth in claim 6, wherein said rate $\{N_2/(Ar+N_2)\}$ is in a range of from 10 to 40%.

* * * * *